United States Patent [19]

Bartkowiak

[11] Patent Number: 5,069,331

[45] Date of Patent: Dec. 3, 1991

[54] HARVESTING CONVEYOR

[76] Inventor: Raymond G. Bartkowiak, 20806 S. Gridley, Space 48, Lakewood, Calif. 90715

[21] Appl. No.: 498,899

[22] Filed: Mar. 26, 1990

[51] Int. Cl.⁵ .............................................. B65G 15/54
[52] U.S. Cl. .................................... 198/848; 198/850; 474/207
[58] Field of Search ................ 198/848, 850; 474/206, 474/207, 212, 214, 217

[56] References Cited

U.S. PATENT DOCUMENTS

| 2,112,911 | 4/1938 | Johnson | 198/848 |
| 2,210,462 | 8/1940 | Noffsinger et al. | 198/848 |
| 2,244,827 | 6/1941 | Crawford | 198/848 |
| 3,618,747 | 11/1971 | Hammond | 198/848 |
| 3,620,356 | 11/1971 | Poesink | 198/848 |
| 3,799,328 | 3/1974 | Harvey | 198/848 X |
| 4,123,947 | 11/1978 | Smith et al. | 474/207 |
| 4,505,383 | 3/1985 | Wheeldon et al. | 198/848 X |
| 4,863,418 | 9/1989 | Fillar et al. | 474/207 |

FOREIGN PATENT DOCUMENTS 0663631  5/1979  U.S.S.R. .............................. 198/848

Primary Examiner—Robert P. Olszewski
Assistant Examiner—James R. Bidwell
Attorney, Agent, or Firm—Frank D. Gilliam

[57] ABSTRACT

The invention is directed to improved and lighter weight links for chains of a harvesting conveyor. The conveyor chain links are constructed of a stronger lighter weight material or constructed with conventional material but of a smaller diameter with a lubricous clip or bushing positioned on the surfaces where the links join to make up the chain. Using aero space composite materials and technology the chains will have an extended life.

8 Claims, 1 Drawing Sheet

HARVESTING CONVEYOR

BACKGROUND OF THE INVENTION

The present invention is directed to conveying chains and more particularly to the links for produce digging conveying chains employed for digging and harvesting of potatoes or the like. Conventional digger chains of the type mentioned are constructed of a plurality of interconnecting links designed to dig and carry the harvested potato or the like and allow any earth thereon to be vibrated from the potato or the like as it transverses the length of the conveyor. The conveyor chains designed to accomplish this task comprise a plurality of individual links which number one hundred and twenty or more. Two or more such conveyor chains are generally used on a potato harvester. These links are made from steel or the like and have an individual weight of around two pounds or more with a chain weight of about two hundred sixty pounds.

As these chains revolve with one end in the earth adjacent to the potatoes being harvested the joinder of the links encounter earth including sand and small rocks and the like. This earth material acts abrasively on the links reducing their normally expected life. Depending on the sand and rock content of a given field of potatoes being harvested, such a conveying chain can have a life of less then one season and must be replaced either link by link as breakage occurs or the entire chain is replaced periodically to prevent harvesting down time for chain replacement which can take many man hours of labor. The economic cost of the chains amounts to several hundred dollars in material and labor for replacement.

A conveyor chain of the type described that would have an extended life and be lighter in weight would find great acceptance in the digging conveyor art.

SUMMARY OF THE INVENTION

This invention is directed to improving the construction and life expectancy of a harvester conveyor chain of the link variety used in harvesting potatoes, sugar beets and the like which grow under ground and are harvested therefrom by use of a conveyor belt.

The invention is directed to reducing the weight of the individual links of the belt and reducing the ware encountered by the links at their joinder with an adjacent link. The present links are constructed of hardened steel of a diameter of one half inch or larger and weigh about two pounds each. The present invention is directed to two means for reducing the weight, namely, reducing the diameter of the hardened steel links to about one half the present diameter or less and inserting a lubricous bushing formed from Teflon, Nylon, Kevlar, graphite, powered metal or the like positioned between the links at their area of joinder or constructing the entire link from a composite material such as, carbon fibre/polyurethane foam, glass fibers/polyurethane foam, polycarbonate, polycarbonate foam, steel tubing of sufficient diameter, tungsten carbide (formed from powder), steel (formed from powder), polytetraflouraethelyne (ptfe), Steel wire mesh, graphite, Teflon fibers, Kevlar, ceramic or the like.

The bushings or links can be constructed by injection molding, reinforced reaction molding, matched die molding (press) or any other convenient method known for shaping or forming the above or like materials.

An object of this invention is to construct a link for a harvesting conveyor that has a life expectancy greater than the links of the present art.

Another object of this invention is to provide a light weight link for a harvesting conveyor.

Still another object of the invention is to produce a bushing constructed of a lubricous material that can be inserted between the contacting areas of adjacent links of a harvester conveyor belt to increase the life of the links of the conveyor which can be replaced when worn in a manner of minutes to prevent excessive down time of the harvester.

Yet another object of the invention is to reduce the fuel consumption of the farm equipment which operates the harvester conveyor due to the lighter weight of the chain conveyor.

These and other objects and advantages of the present invention will become apparent to those skilled in the art after a consideration of the following detailed description, taken in conjunction with the accompanying drawing Figures, in which:

DESCRIPTION OF THE PREFERRED EMBODIMENTS

Figure 1:
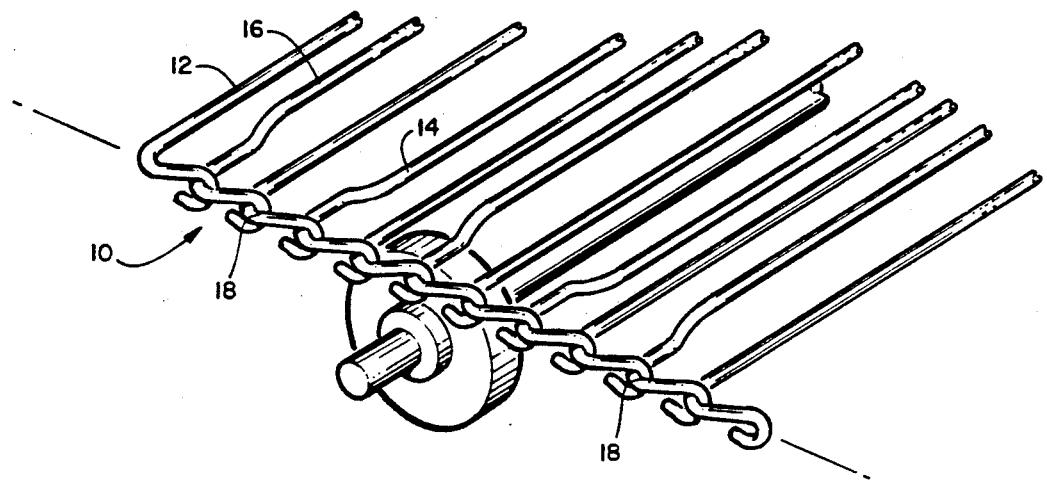
FIG. 1 is a partial perspective showing of a chain conveyor of the invention including the individual interconnecting links.

Referring now to the various drawing Figures, FIG. 1 depicts a partial perspective showing of a chain link conveyor belt 10 used for the harvest of potatoes and the like produce growing under ground which are harvested in a manner like potatoes. The chain is constructed of a plurality of interconnecting links 12, 14 and 16 of generally these three types. Links 12 are straight between their interconnecting ends, links 14 are formed in an upwardly direction and links 16 are formed in the opposite direction to links 14. The various configuration of the links between their ends provides a means to knock the soil off of the harvested product as it moves along the belt and also provides a means for the harvested product to be conveyed therealong. Generally these links are formed of hardened steel. In the first embodiment shown, the links are formed of a strong light weight aero space type material such as, carbon fibers/polyurethane foam, glass fibers/ polyurethane foam, polycarbonate, polycarbonate foam, steel tubing, tungsten carbide (powdered), steel (powdered), polytetraflouraethelyne (ptfe), steel wire mesh, graphite, Teflon, Kevlar, or the like. Constructed from the above material will allow the links to be made of a smaller diameter and, therefore reduce their weight in two ways, namely, reduction in size due to the increased strength of the material and a further reduction to the decreased weight of the materials.

Figure 2:
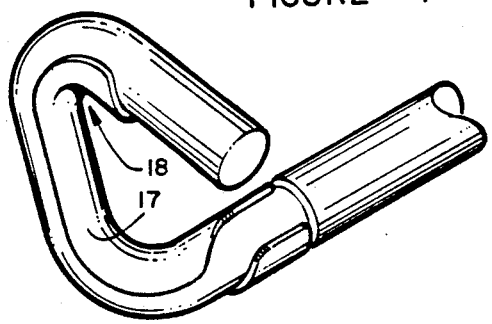
FIG. 2 is a partial perspective showing of a chain link with a bushing of the invention positioned thereon.

Referring now specifically to FIG. 2, In this showing of a second embodiment of the invention a cap or overlay bushing 17 is shown. This cap or overlay bushing snaps onto the end of the links and covers the area of wear, namely, in the area of the interconnection of the links when attached to form the link conveyor 10. As can be seen in FIG. 2, the links between the ends are formed with a greater diameter than the end area of the links which accepts the cap or overlay bushing. The decreased diameter becomes substantially equal to the larger diameter of the link when the cap or overlay bushing is installed thereon making the diameter of the link substantially uniform from end to end. The bushing is constructed from a long ware lubricous material such as, for example, Teflon, Kevlar, graphite, powdered metal, ceramic or the like that is inexpensive to manufacture and is somewhat resilient for ease of installation. By the use of the cap or overlay bushing 17 the chain links 12, 14 or 16 need not be changed because the ware between the links is replaced with ware to the inner surface of the cap or overlay bushing which can be removed when excessably worn and changed very easily when with a new one. The links have an infinite life when a cap or overlay bushing is employed at the link joinder surface.

Figure 3:
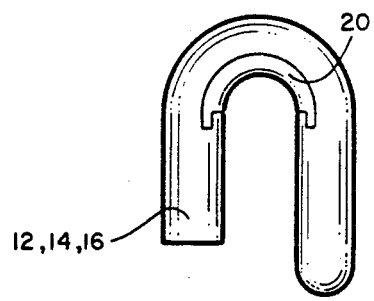
FIG. 3 is an end view showing of a chain link of the invention with an lubricous insert at the point of wear.
Figure 4:
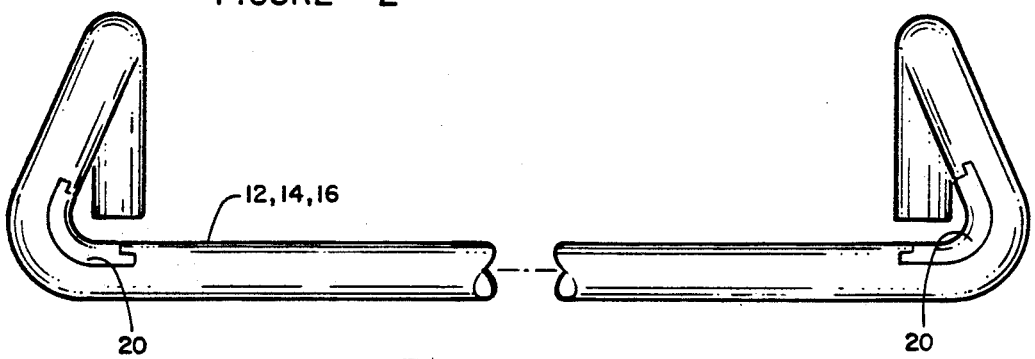
FIG. 4 is side view of the chain link of FIG. 3.

Referring now to drawing FIGS. 3 and 4, these Figures depict a link of a third embodiment of the invention formed with a lubricous insert 20 at the point of wear 18 between joined links. The insert can be constructed of the same material as the cap or overlay bushing 17. The insert 20 can be cast into a selectively located groove in the link or adhered to the inner surface of the groove by a suitable adhesive or the like.

It should be understood that the links themselves of the last two embodiments of the present invention can be constructed in a conventional manner using hardened steel or can be fabricated from the aero-space materials listed above under the first embodiment.

The ware areas of the links using any one of the described embodiments can be constructed with a ware indicator therein to indicated to the casual observer that the links, cap or overlay bushing or inserts are wearing and need to be replaced. An indicator can be formed of different colored material near the minimum allowable thickness in the ware area, or thread cast into the material at the minimum thickness area, a different material than the principle construction material of the links so that a sound will be admitted from an excess worn link area, or any other convenient means to indicate maximum allowable ware at the areas of link joinder.

While described above and shown in the accompanying drawing Figures are the preferred structures in which the principles of the present invention have been embodied, it is to be understood that the invention is not limited to the particular details shown and described above, but that, in fact, widely different means may be employed in the practice of the broader aspects of the invention.

What is claimed is:

1. An improved link for a conveyor having a plurality of interconnected adjacent links with substantially uniform diameters comprising:

said link includes a cutout area where ware occurs between said interconnected adjacent links making up the conveyor, said cutout is filled with a lubricous material so that the overall diameters of said links including said filled cutout area remains substantially uniform.

2. The invention as defined in claim 1 wherein said links are constructed from a strong light weight material, said material selected from the following group of materials, carbon fibers/polyurethane foam, glass fibers/polyurethane foam, polycarbonate, polycarbonate foam, steel tubing, tungsten carbide (powdered), steel (powdered), polytetraflouraethelyne, graphite, Teflon fibers and Kevlar fibers.

3. The invention as defined in claim 1 wherein said lubricous material is formed of Kevlar.

4. The invention as defined in claim 1 wherein said lubricous material is constructed of Nylon.

5. The invention as defined in claim 1 wherein said lubricous material is formed of graphite.

6. The invention as defined in claim 1 wherein said lubricous material is formed of powdered metal.

7. The invention as defined in claim 1 wherein said lubricous material is formed of ceramic.

8. The invention as defined in claim 1 wherein said lubricous material includes a wear indicator.

* * * * *